Oct. 3, 1944.  D. M. SAYLER  2,359,586
TRACTION DEVICE
Filed Nov. 9, 1943

Daniel M. Sayler,
INVENTOR

BY Victor J. Evans & Co.
ATTORNEYS

Patented Oct. 3, 1944

2,359,586

UNITED STATES PATENT OFFICE 2,359,586

TRACTION DEVICE

Daniel M. Sayler, Richmond, Calif.

Application November 9, 1943, Serial No. 509,635

3 Claims. (Cl. 305—10)

This invention relates to a traction device and has for an object to provide a pneumatic rubber tread for an endless track, adapted to promote traction by the provision of a pneumatic tire unit for each link of the track adapted to sink into soft ground much in the nature of a heavy cleat, and further to reduce shocks and jars to the parts of the tractor or other machine for increasing the life of the machine, and further to promote easy riding on hard surfaces and thus reduce fatigue of the operator, and further to promote ease of steering.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1:
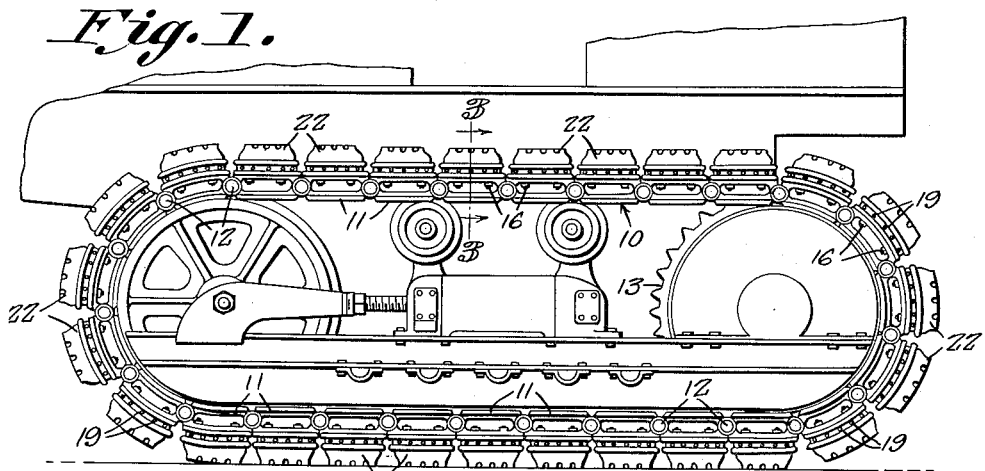
Figure 1 is a side elevation of an endless track equipped with a pneumatic tire formed of units attached to respective links.

Referring now to the drawing in which like characters of reference designate similar parts in the various views, 10 designates a conventional endless track formed of links 11 connected by pivot pins 12 and driven by respective cog rollers 13.

Figures 2, 3:
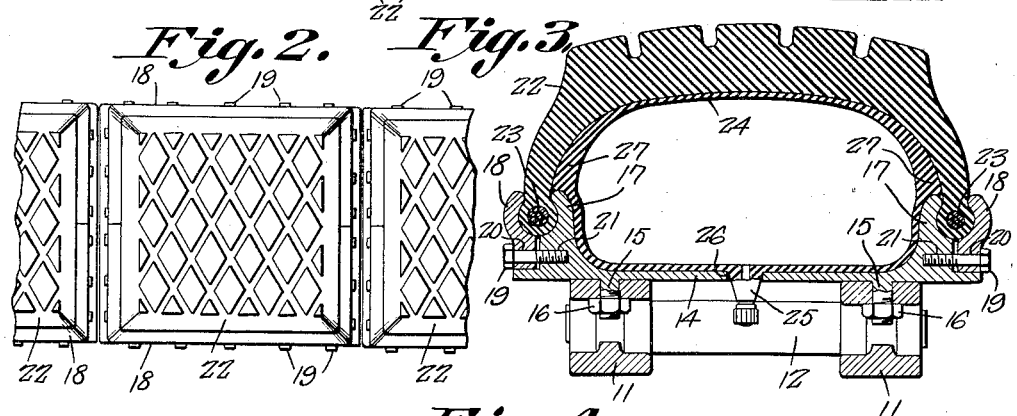
Figure 2 is a plan view of one of the pneumatic tire units and portions of two adjacent units.
Figure 3 is a cross sectional view through one of the units taken on the line 3—3 of Figure 1.
Figure 4:
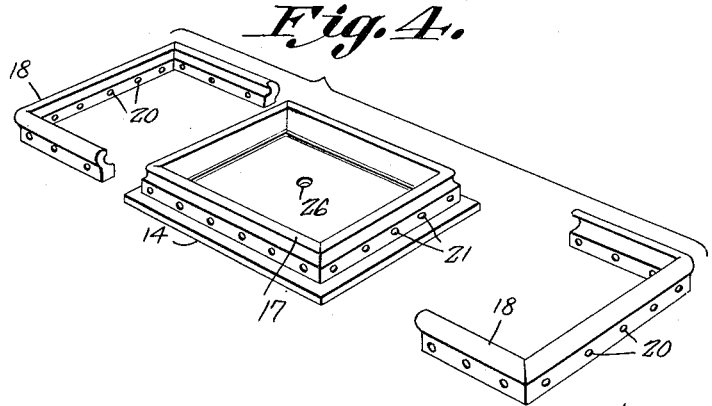
Figure 4 is a detail perspective view showing the base plate, inner rim, and a sectional outer rim of one of the units, the parts being shown separated.

In carrying out the invention each unit of the pneumatic rubber tread comprises a flat base plate 14 adapted to be bolted to the links 11 by bolts 15 formed integral with the base plate and provided with respective nuts 16 adapted to engage the link of the endless track, see Figure 3. The base plate is substantially rectangular in contour.

An inner rim 17 of like contour is welded or otherwise secured to the outer side of the base plate. A sectional rim is carried by the base plate and comprises a pair of substantially U-shaped sections 18 which may be assembled with the inner rim by endless sliding movement on the base plate toward each other. The sectional rim is removably secured to the inner rim by screw bolts 19 engaged through registering openings 20 and 21 in the outer rim sections and in the inner rim.

A rubber tread and casing 22 of substantially semispherical cross section, and of substantially rectangular outline, is provided with inextensible beads 23 all around the marginal edge adapted to be clamped between the inner rim 17 and outer rim 18 by the aforesaid screw bolts 19.

A pneumatic inner tube 24 is mounted upon the base plate within the inner rim 17 and within the tread and casing 22. The inner tube is equipped with an inflating valve 25 which extends through an opening 26 in the base plate.

The inflatable inner tube is provided at that portion thereof close to the outer edge of the inner rim, with integral beads 27 which are of greater thickness than the thickness of the wall of the inner tube and prevent pinching of the inner tube between the tread and casing and the inner rim.

The pneumatic rubber tread casing of each unit acts as a cleat to promote traction in difficult terrain and also the resiliency thereof promotes easy riding as well as reduces shocks and jars to increase the long life of the track and the machine to which it is applied.

From the above description it is thought that the construction and operation of the invention will be fully understood without further explanation.

What is claimed is:

1. A pneumatic tread endless track, comprising two endless series of links connected together by pivot pins which in turn connect the two series of links together, a flat base plate secured to each link and provided with a rim around all sides thereof, a pneumatic tire on the outside of said rim, and sectional securing rims clamping the tire to the first mentioned rim.

2. A pneumatic tread endless track, comprising two endless series of links connected together by pivot pins which in turn connect the two series of links together, a flat base plate mounted on each link and provided with inwardly extending lugs passing through the links, securing means on the inner ends of the said lugs, a pneumatic tire on the outside of the base plate, and sectional securing rims for clamping the tire to the base plate.

3. A pneumatic tread endless track, comprising two endless series of spaced links connected together by pivot pins which in turn connect the two series of links together, a flat base plate bridging the space between the two series of links, inwardly extending lugs carried by the base plate and passing through links of each series of links, an outwardly extending rim arranged around all sides of the base plate, a pneumatic tire on the outside of the rim, and sectional securing rims clamping the tire to the first mentioned rim.

DANIEL M. SAYLER.